Figure 1:
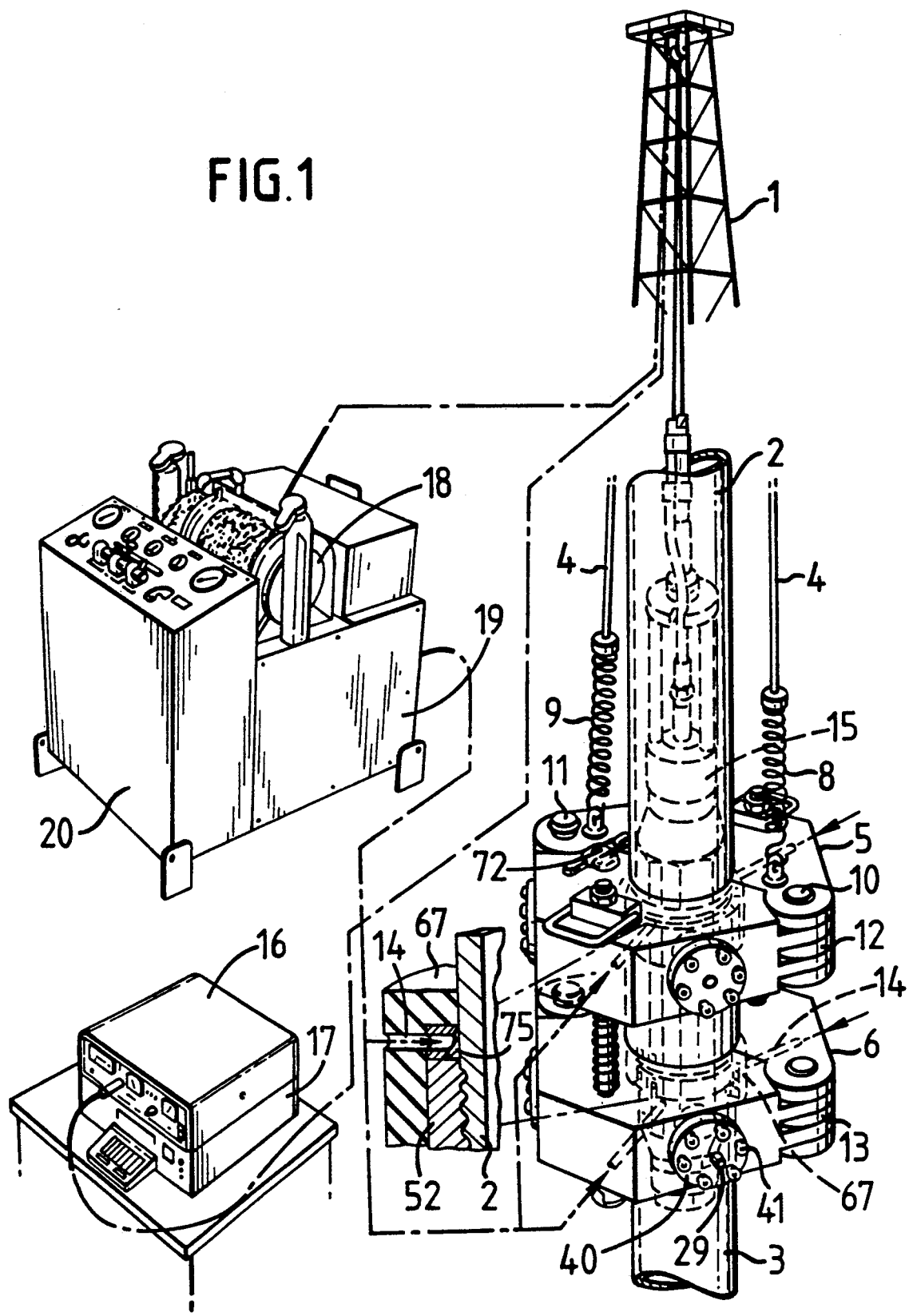

United States Patent [19]
Jansch

[11] Patent Number: 5,255,559
[45] Date of Patent: Oct. 26, 1993

[54] APPARATUS FOR TESTING THE GAS-TIGHTNESS OF A JOINT BETWEEN HOLLOW MEMBERS

[75] Inventor: Manfred Jansch, Garbsen, Fed. Rep. of Germany

[73] Assignee: Weatherford/Lamb, Inc., Houston, Tex.

[21] Appl. No.: 860,740

[22] Filed: Mar. 25, 1992

[30] Foreign Application Priority Data

Mar. 28, 1991 [DE] Fed. Rep. of Germany ....... 4110271
Oct. 18, 1991 [DE] Fed. Rep. of Germany ....... 4134489

[51] Int. Cl.⁵ .......................................... G01M 3/28
[52] U.S. Cl. ........................................ 73/46; 73/49.6
[58] Field of Search ............... 73/46, 49.1, 40.5 R, 73/40, 49.8, 47.6

[56] References Cited

U.S. PATENT DOCUMENTS

| | | | |
|---|---|---|---|
| 1,788,845 | 1/1931 | Reynolds | 73/46 |
| 1,931,502 | 10/1933 | Markle et al. | 73/46 |
| 2,504,530 | 4/1950 | Jacobs | 73/40 |
| 2,571,236 | 10/1951 | Hamilton, Jr. | 73/46 |
| 2,587,192 | 2/1952 | Meyer | 73/46 |
| 2,766,614 | 10/1956 | Cook | 73/46 |
| 2,817,230 | 12/1957 | McCully | 73/46 |
| 3,000,205 | 9/1961 | Suderow | 73/46 |
| 3,371,521 | 3/1968 | Hauk | 73/46 |
| 3,871,209 | 3/1975 | Hasha | 73/46 |
| 3,949,596 | 4/1976 | Hawk | 73/40.7 |
| 4,010,633 | 3/1977 | Hasha | 73/46 |
| 4,132,111 | 1/1979 | Hasha | 73/46 |
| 4,136,552 | 1/1979 | Hasha | 73/46 |
| 4,152,926 | 5/1979 | Hasha | 73/46 |
| 4,194,389 | 3/1980 | Laging | 73/46 |
| 4,254,655 | 3/1981 | Keast et al. | 73/49.5 |
| 4,407,171 | 10/1983 | Hasha et al. | 73/46 |
| 4,416,147 | 11/1983 | Hasha | 73/49.6 |
| 4,429,566 | 2/1984 | Arnell et al. | 73/40.7 |
| 4,458,521 | 7/1984 | Pillette | 73/46 |
| 4,753,108 | 6/1988 | Jansch | 73/49.8 |
| 4,838,073 | 6/1989 | Jansch | 73/40.7 |
| 4,876,884 | 10/1989 | Jansch | 73/49.1 |
| 4,926,680 | 5/1990 | Hasha et al. | 73/46 |

FOREIGN PATENT DOCUMENTS

| | | | |
|---|---|---|---|
| 2241117 | 6/1985 | German Democratic Rep. | 73/46 |
| 2163789A | 7/1984 | United Kingdom . | |
| 2237393 | 5/1991 | United Kingdom | 73/46 |

OTHER PUBLICATIONS

"1990-91 General Services and Products Catalog" Weatherford 1989.
"Helium sniffer finds casing joint leaks," The Oilman, 1985.
"H.E.L.L. On Leaks," Loomis Int'l Inc., 1984.

Primary Examiner—Hezron E. Williams
Assistant Examiner—Joseph W. Roskos
Attorney, Agent, or Firm—Guy McClung

[57] ABSTRACT

An apparatus for testing the gas-tightness of a joint between hollow members which has, in one aspect, a mechanism for applying a test gas to the outside of a joint, detection apparatus for detecting the gas inside the hollow members, and wherein the mechanism for applying the test gas to the outside of the joint has a gas testing chamber, a sealing ring for hermetically sealing the gas testing chamber, a casing enclosing the sealing ring, apparatus for applying pressure to the sealing ring, and apparatus for supplying test gas to the gas testing chamber.

19 Claims, 14 Drawing Sheets

APPARATUS FOR TESTING THE GAS-TIGHTNESS OF A JOINT BETWEEN HOLLOW MEMBERS

This invention relates to an apparatus for testing the gas-tightness of a joint between hollow members, more particularly screwed connections between pipes and between pipes and sockets, using a test gas which can be highly pressurized and a measuring device for determining and displaying any traces of gas passing through the connection.

To eliminate leakages in connections between hollow members, for example, two pipes, the joint is normally subject to a gas leakage test wherein a pressurized test gas is conveyed to the test location and the pressure is checked. A drop in the pressure of the test gas indicates a leakage.

In another know test procedure a gas is taken through two interconnected tubular members, the gas pressure being applied from inside by means of a shut-off tool. Such a procedure and a tool for its performance are disclosed, for example, in German OS 30 30 665. Disposed on the outside of the testing places are measuring instruments by means of which any emerging traces of gas can be indicated.

Another testing apparatus is disclosed in U.S. Pat. No. 3,797,068. It can be driven into a cavity in which a joint place is to be tested for the passage of air. It forms an annular test chamber inside the walls of the cavity. The test chamber is filled with air and a manometer is observed to determine whether the pressure can be maintained and the joint regarded as sound. The test pressure can reach only low values, since due to their large dimensions, the outer sealing chambers allow only low pressures.

The aforementioned constructions have the disadvantage that they require considerable quantities of testing gas for the testing procedures. With the use of the prior art apparatuses, the testing gas must be generated and compressed in large quantities. However, large quantities of gas combined with high pressures cause considerable risks, not only in the zone of the test apparatus itself, but even in the generating apparatus and the supply pipe extending therefrom to the testing apparatus.

To obviate these risks, German Patent Specification 37 00 384 proposes an apparatus for testing the gas-tightness of connections between hollow members by which the quantity of test gas required can be appreciably reduced, thereby considerably improving safety. Moreover, the level of the test pressure can be substantially increased—i.e., well above 1000 bar. However, the aforementioned apparatus is able to check the gas-tightness of the hollow members only from the inside to the outside. However, the converse conditions often occur when hollow members are used in pressure zones. Only one example, which can be mentioned here, is the use of pipes in gas caverns. In that case gas-tightness from the outside to the inside is decisive for testing. The test pressure must therefore be applied from outside, and traces of gas passing through the connection between the hollow members must be determined and measured in the interior. The apparatus disclosed in German Patent Specification 37 00 384 is not able to do this.

It is an object of the invention to provide an apparatus of the kind specified by means of which the test pressure can be applied at the external periphery of the hollow members, and traces of gas penetrating through leakages through the joint can be determined.

SUMMARY OF THE INVENTION

The present invention provides an apparatus for testing the gas-tightness of a joint between hollow members, which apparatus comprises:
  a) test gas applying means for applying a test gas to the outside of said joint; and
  b) means for detecting test gas in said hollow members;
wherein said test gas applying means comprises:
  c) a gas testing chamber;
  d) a sealing ring of elastomeric material for hermetically sealing said gas testing chamber;
  e) a casing enclosing said sealing ring;
  f) pressure applying means for applying pressure to said sealing ring; and
  g) means to supply a test gas to said gas testing chamber.

At least preferred embodiments of apparatus according to the invention allow the reliable testing of the gas-tightness of joints using very small quantities of test gas, so that very high test pressures of well above 1000 bar can be safely used. Both simple separating lines (joints) can be checked, in which the diameters of the hollow bodies are identical on both sides of the separating line, and also separating lines in which the hollow bodies have different diameters on the two sides, for example, the separating lines of pipe/socket connections.

Further advantageous features of the subject matter of the invention are set forth in the subclaims.

Figure 2:
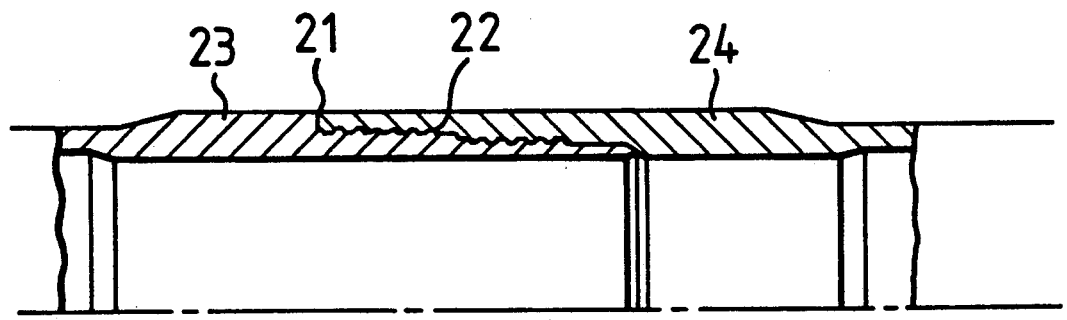
Figure 3:
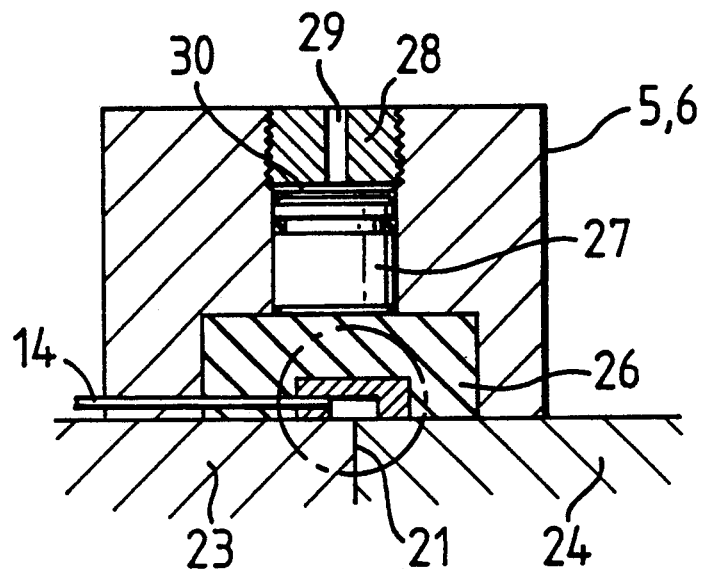
Figure 3A:
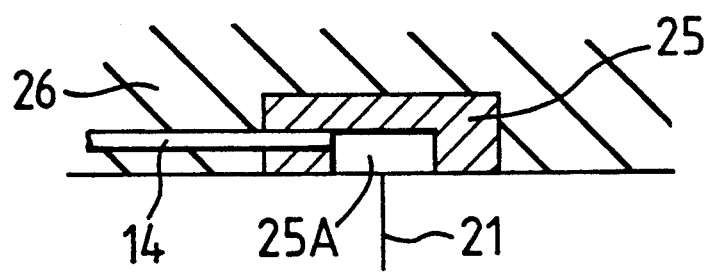
Figure 4:
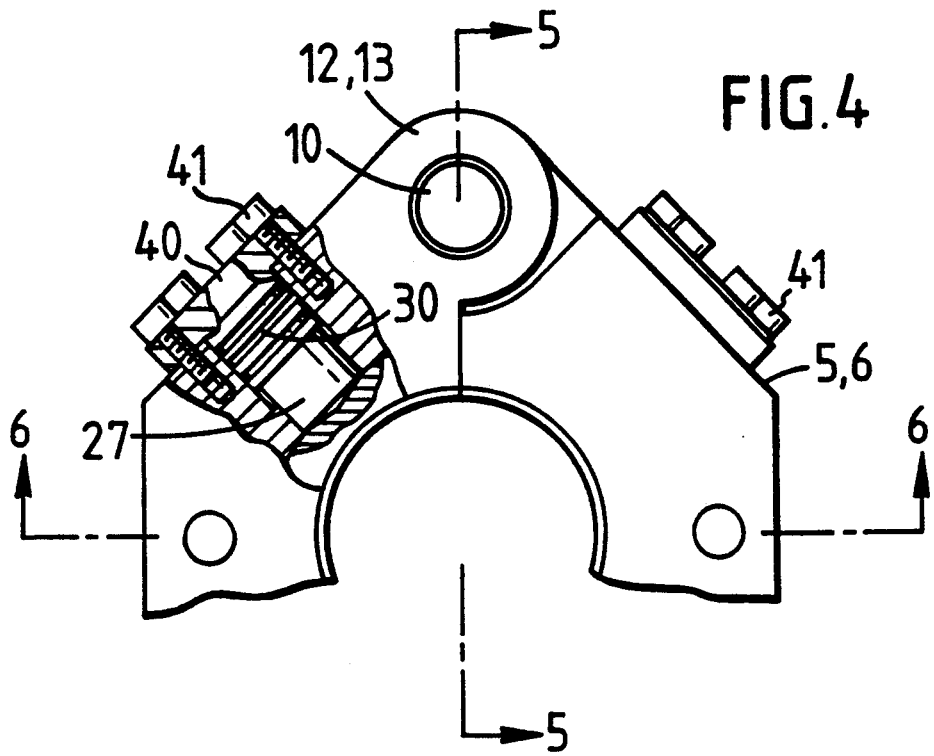
Figure 5:
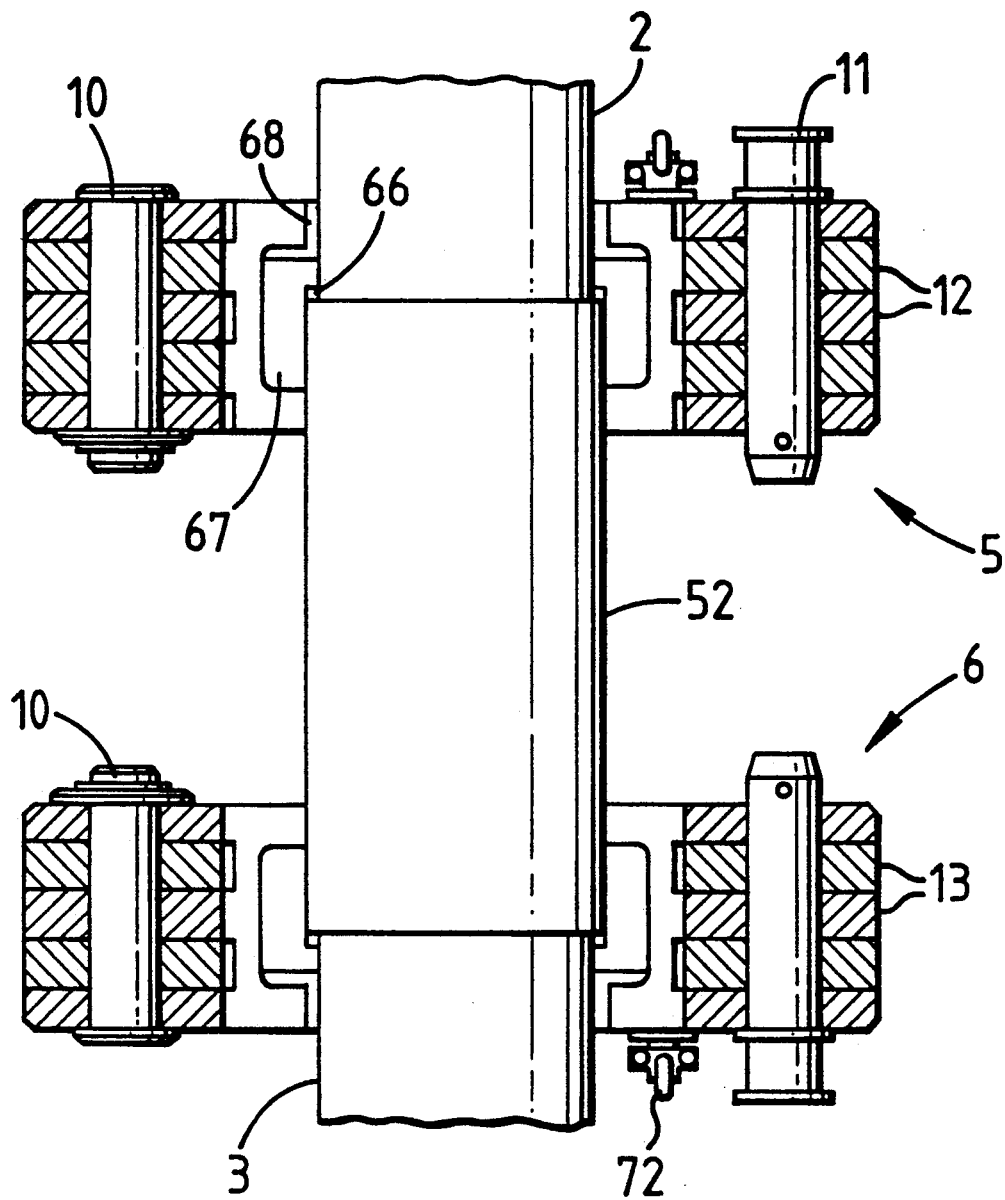
Figure 6:
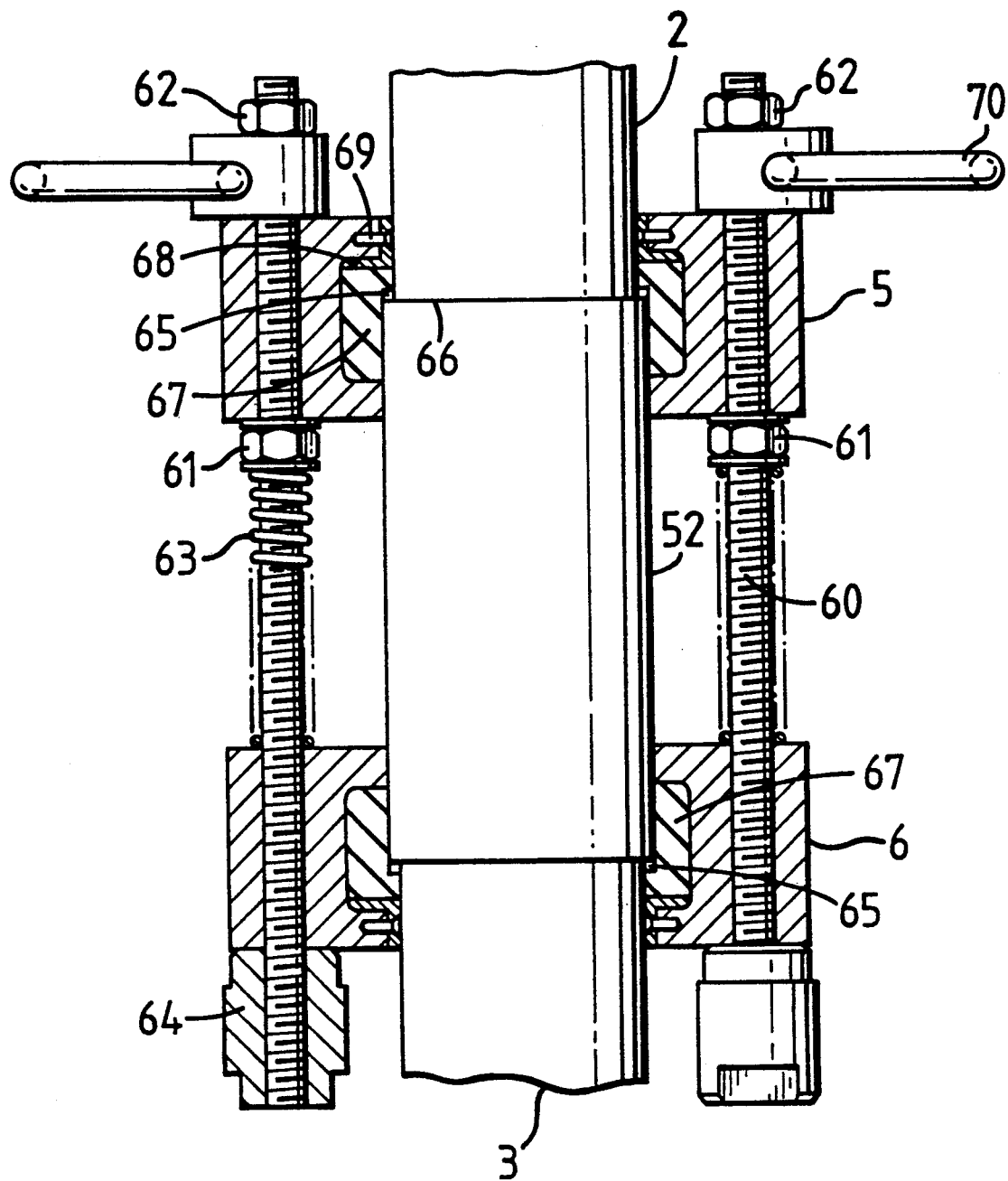

Embodiments of the invention will now be explained which are illustrated in the purely diagrammatic drawings, wherein:

FIG. 1 is an overall view of an apparatus in accordance with the invention in use on a drilling tower, FIG. 2 is a longitudinal section through a screwed connection between two pipe ends of identical diameter, FIG. 3 is a cross-section to an enlarged scale through an apparatus in the zone of a separating line, FIG. 3a is a cross-section to a further enlarged scale of the area encircled in FIG. 3, FIG. 4 is a partially sectioned plan view of one of the two casings of an overall apparatus, FIG. 5 is a longitudinal section through the overall apparatus along line 5—5 of FIG. 4, FIG. 6 is another longitudinal section through the overall apparatus along line 6—6 of FIG. 4.

Figure 7:
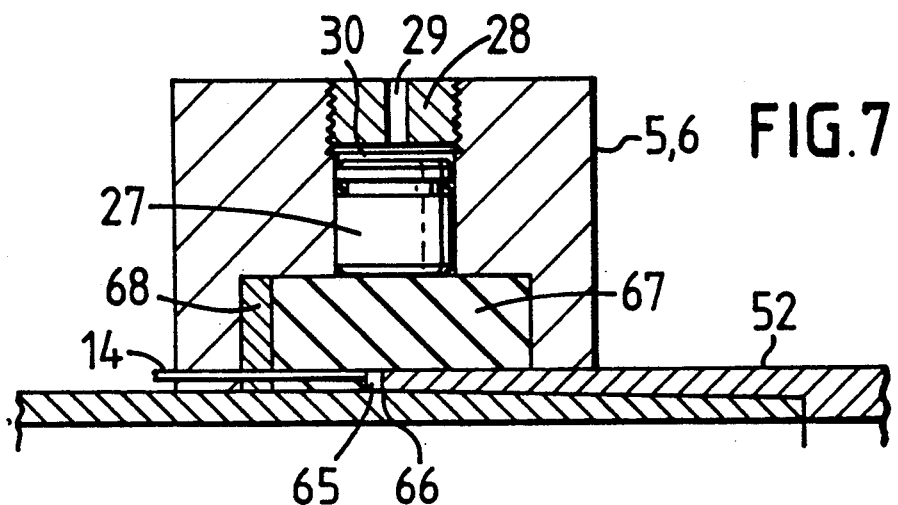
Figures 7A, 7B:
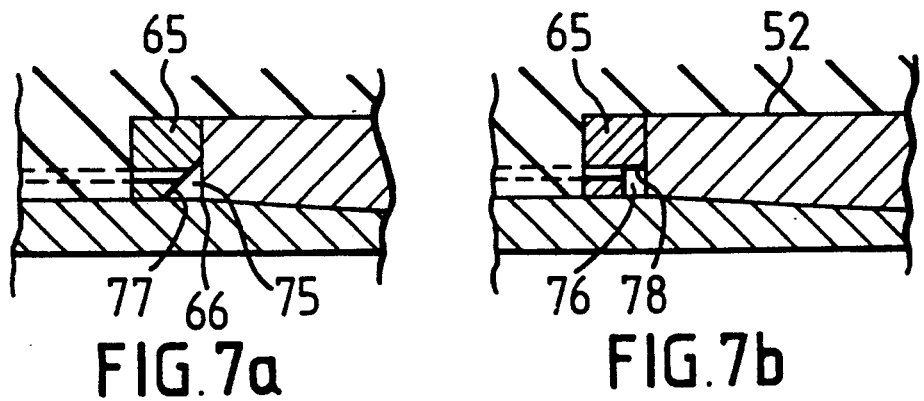
Figure 8:
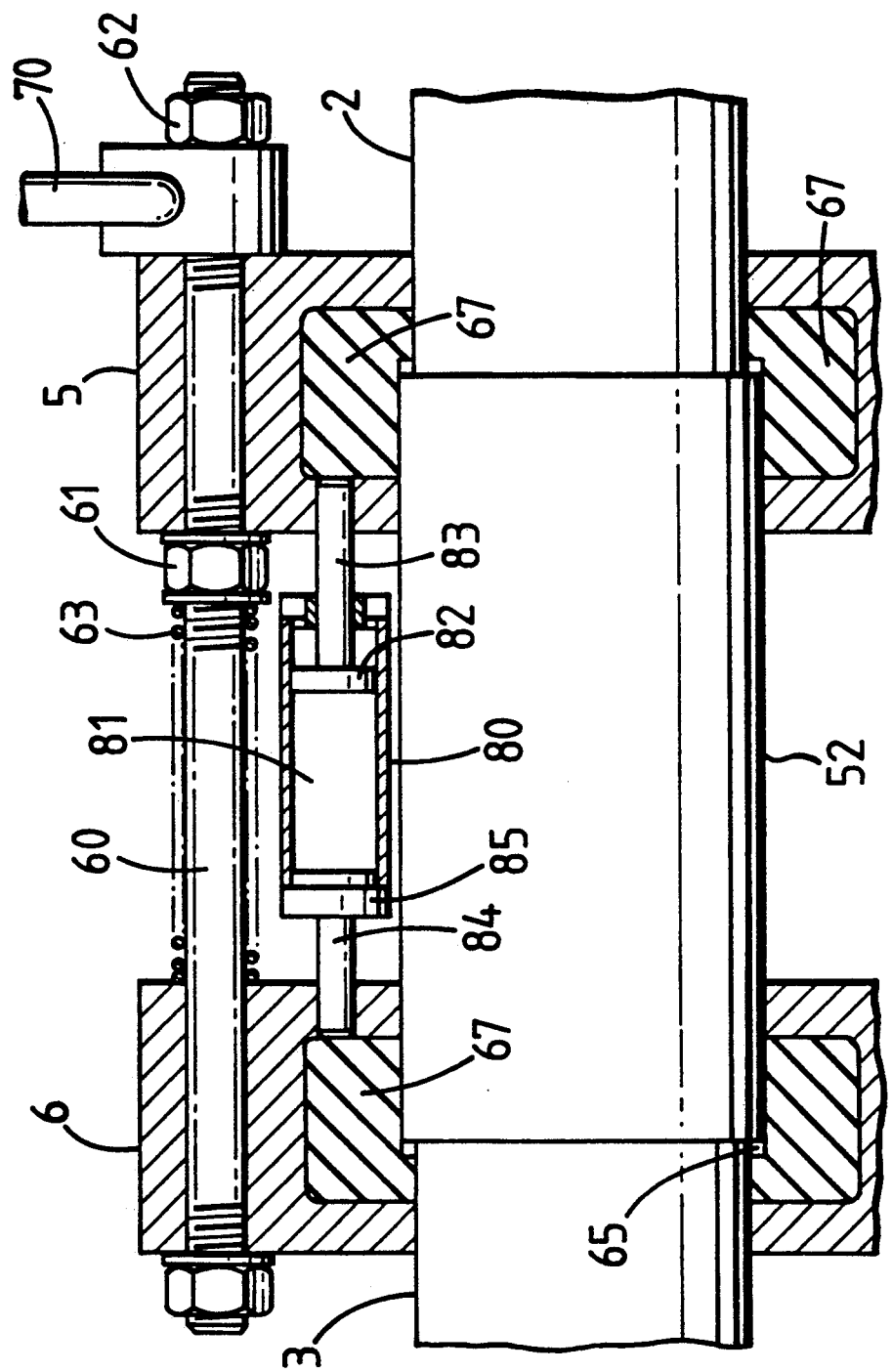
Figure 9:
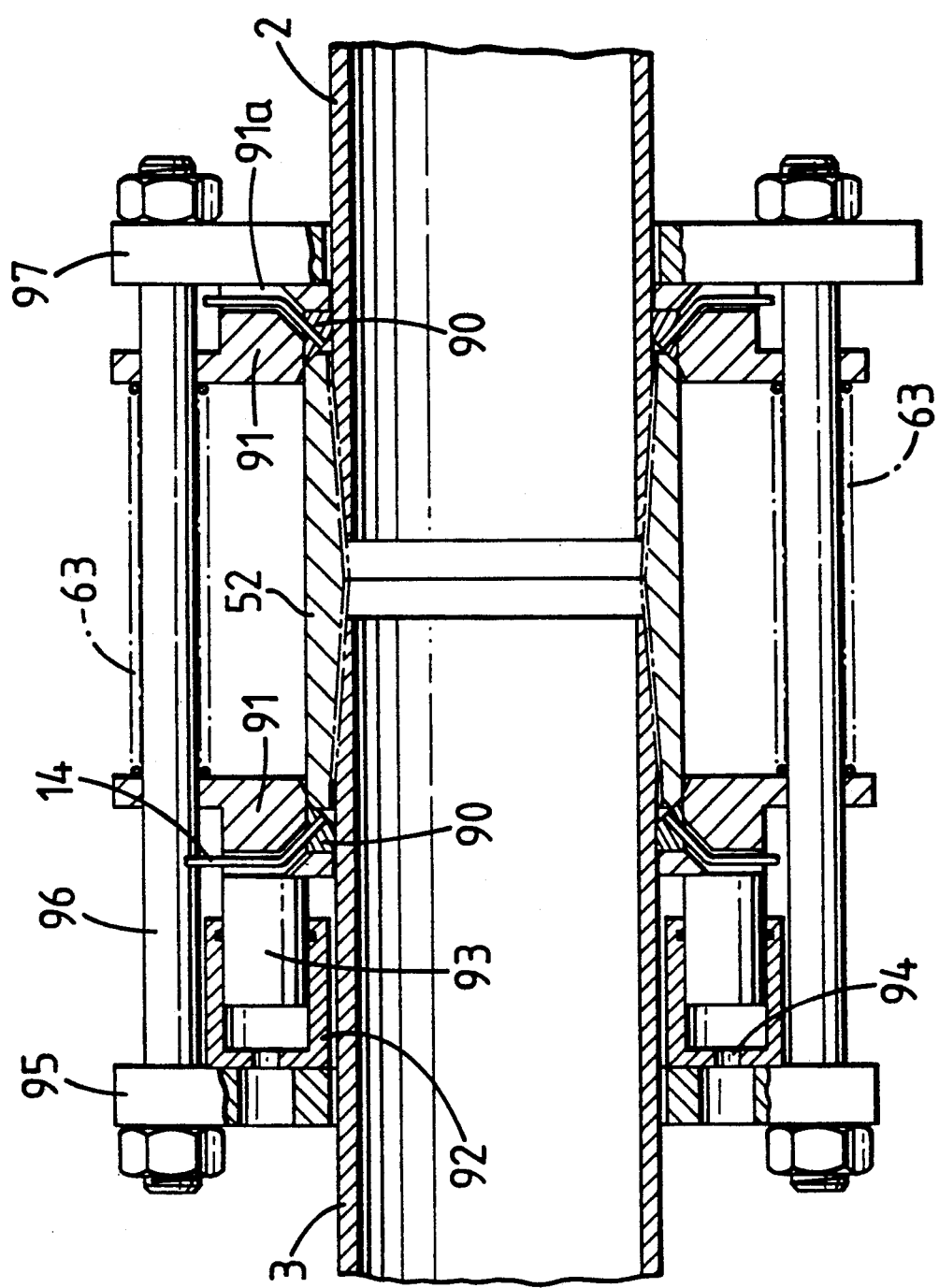
Figure 10:
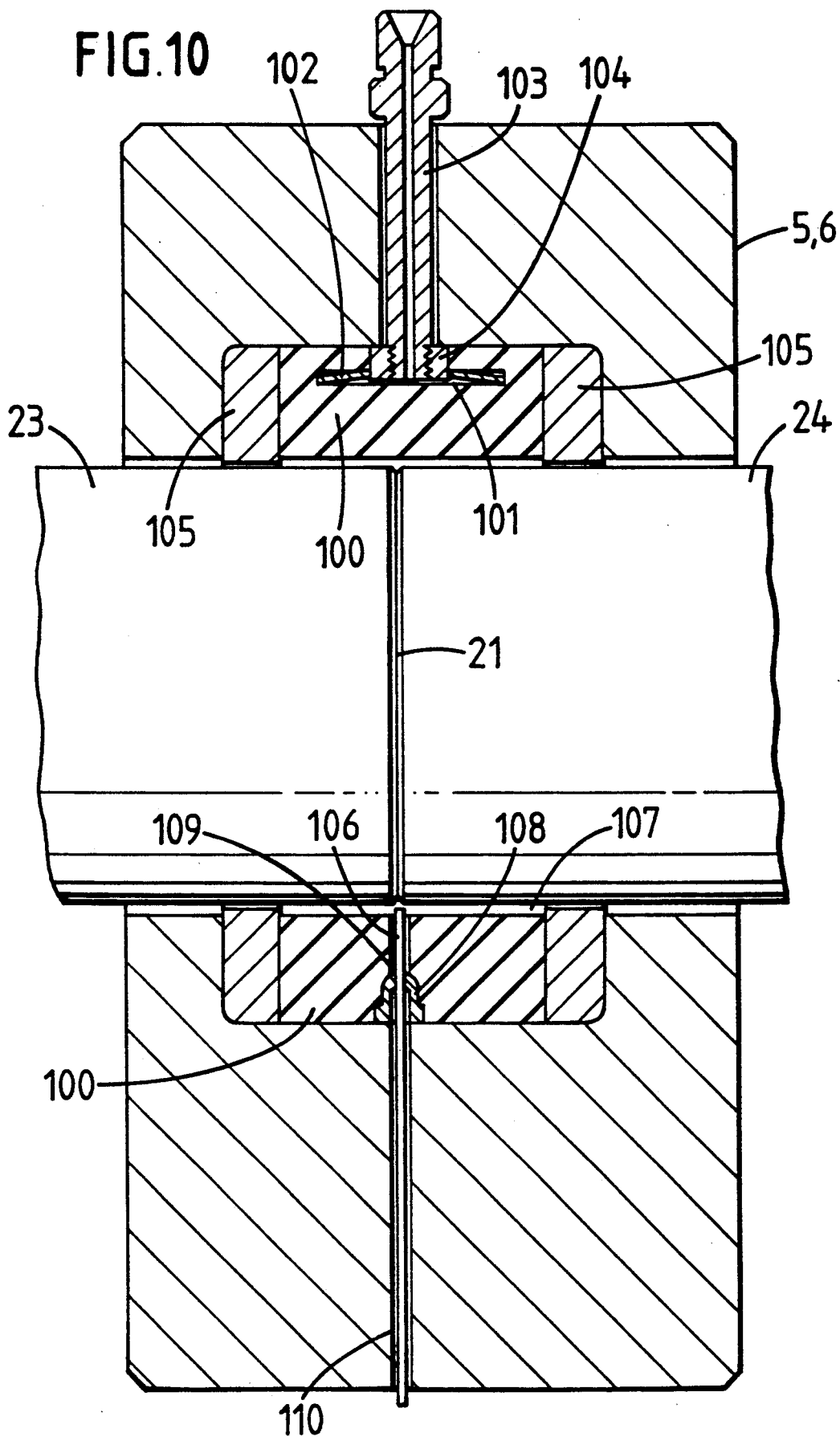
Figure 11:
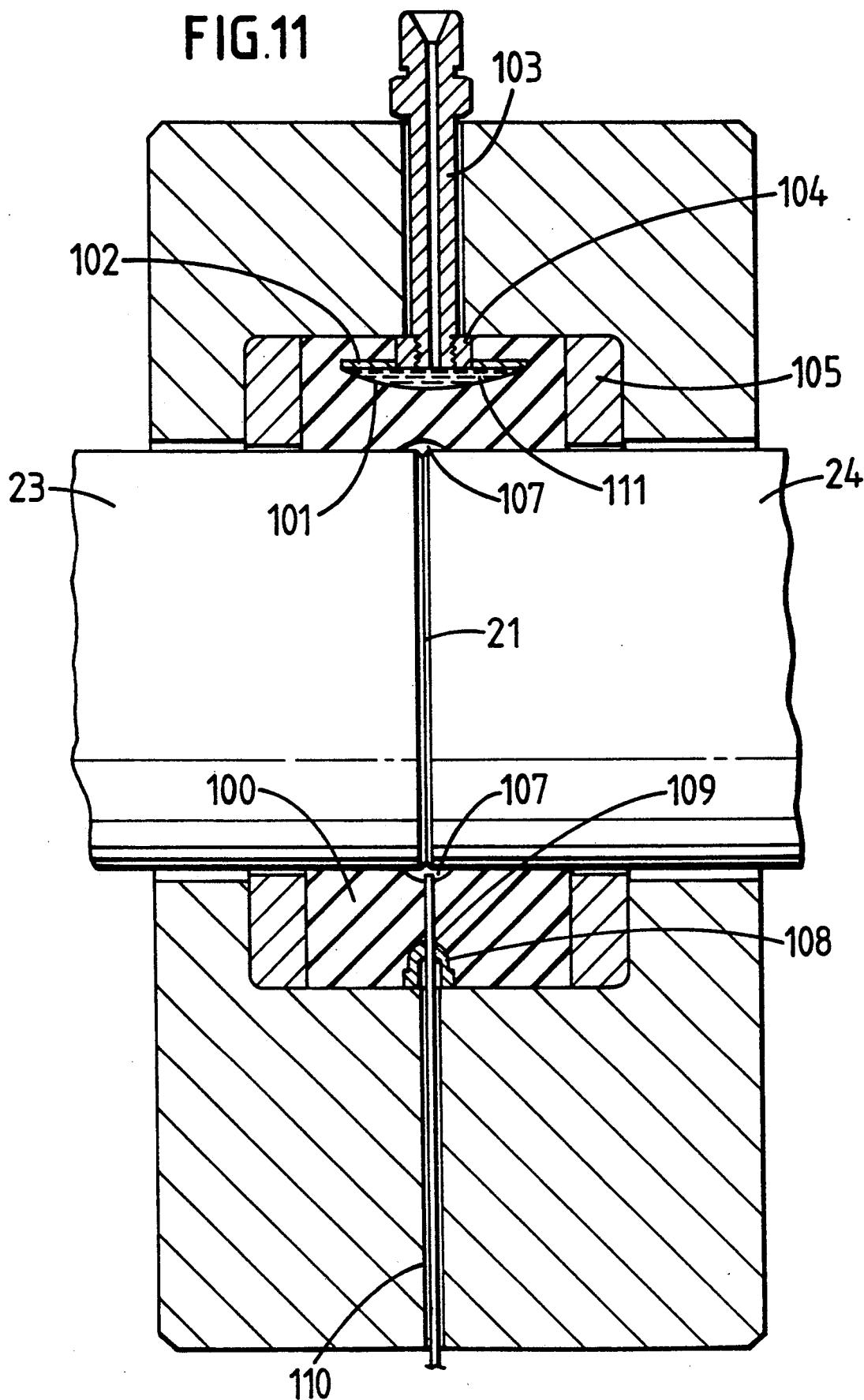
Figure 12:
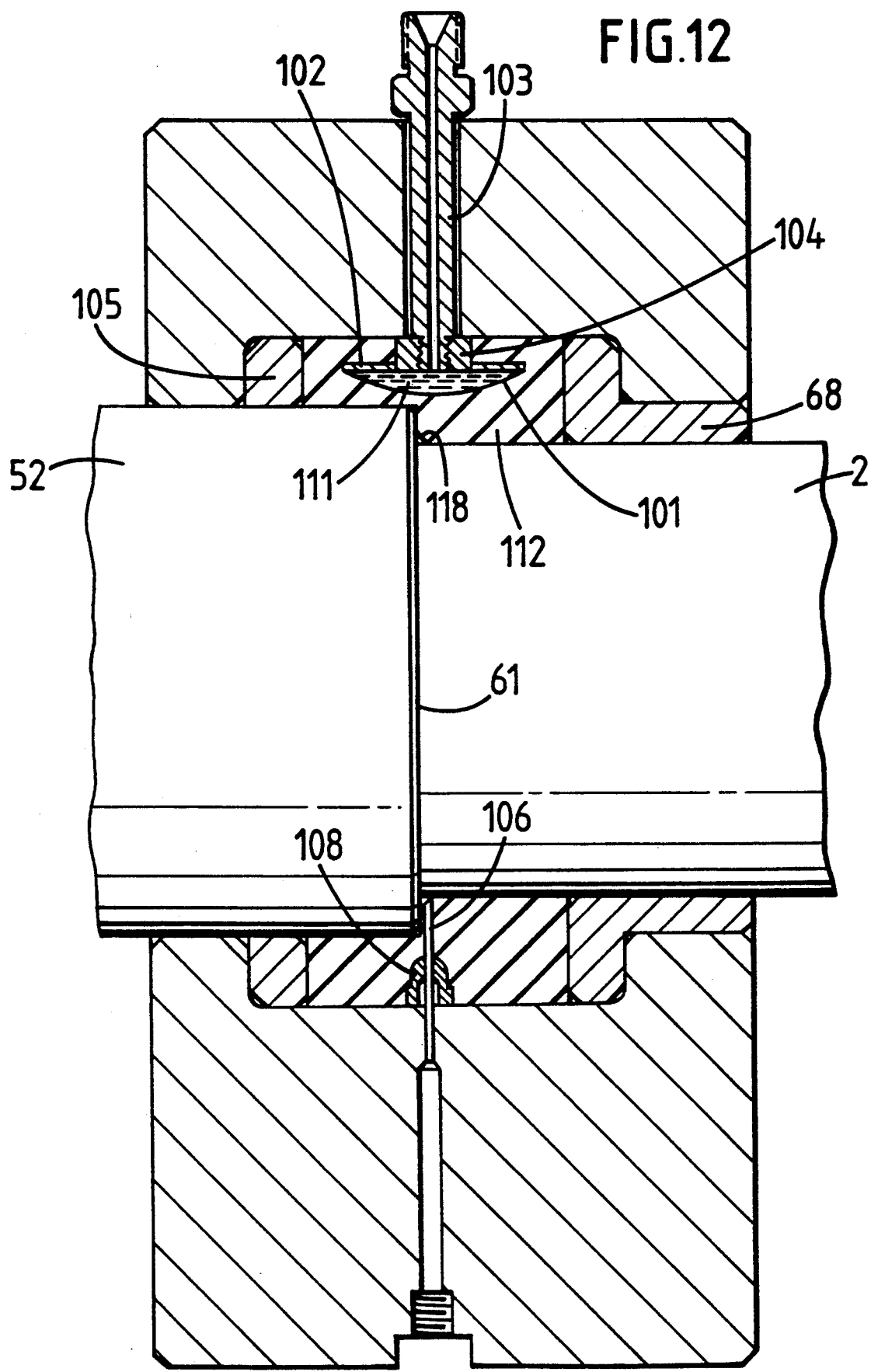
Figure 13:
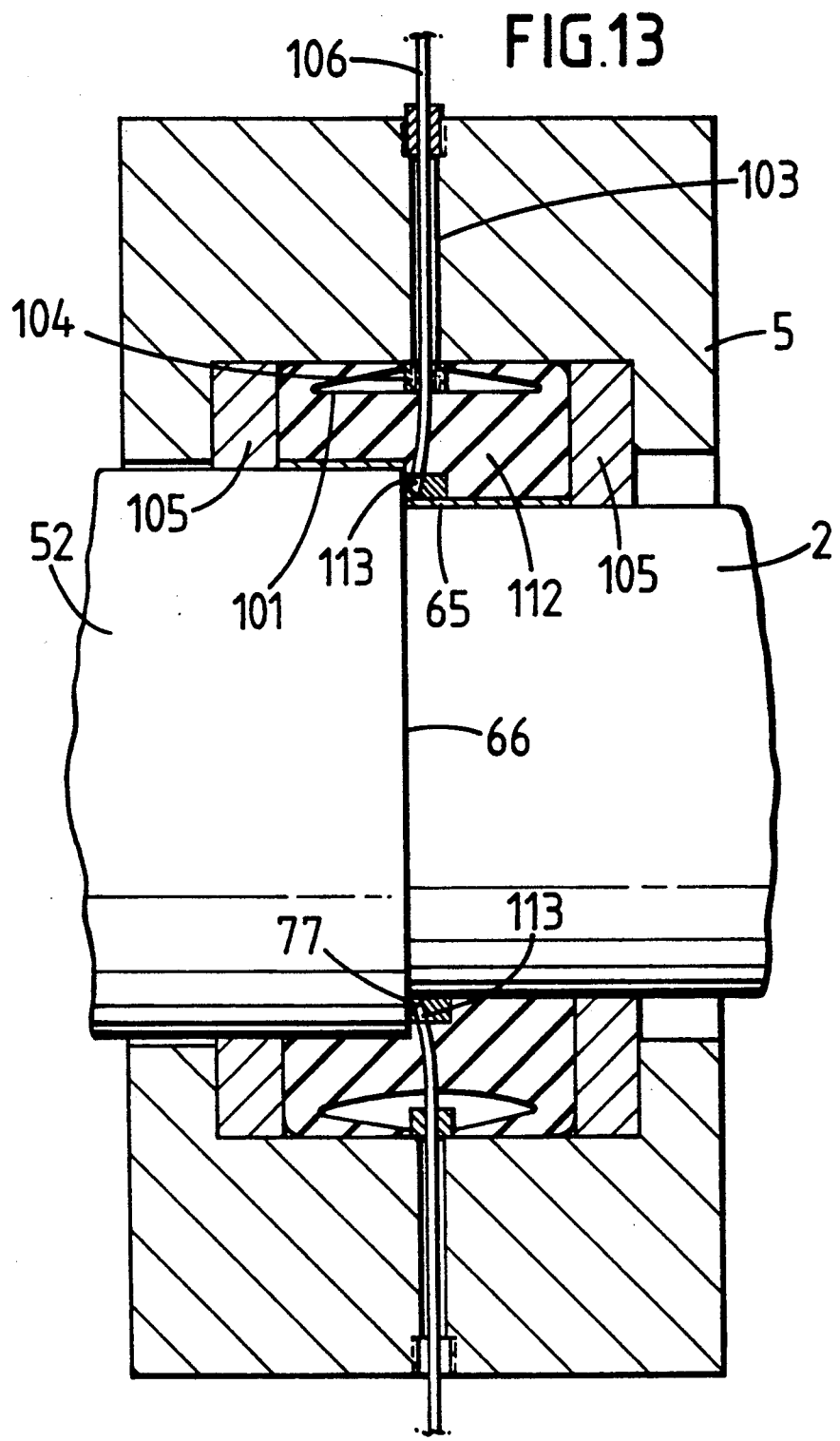
Figure 14:
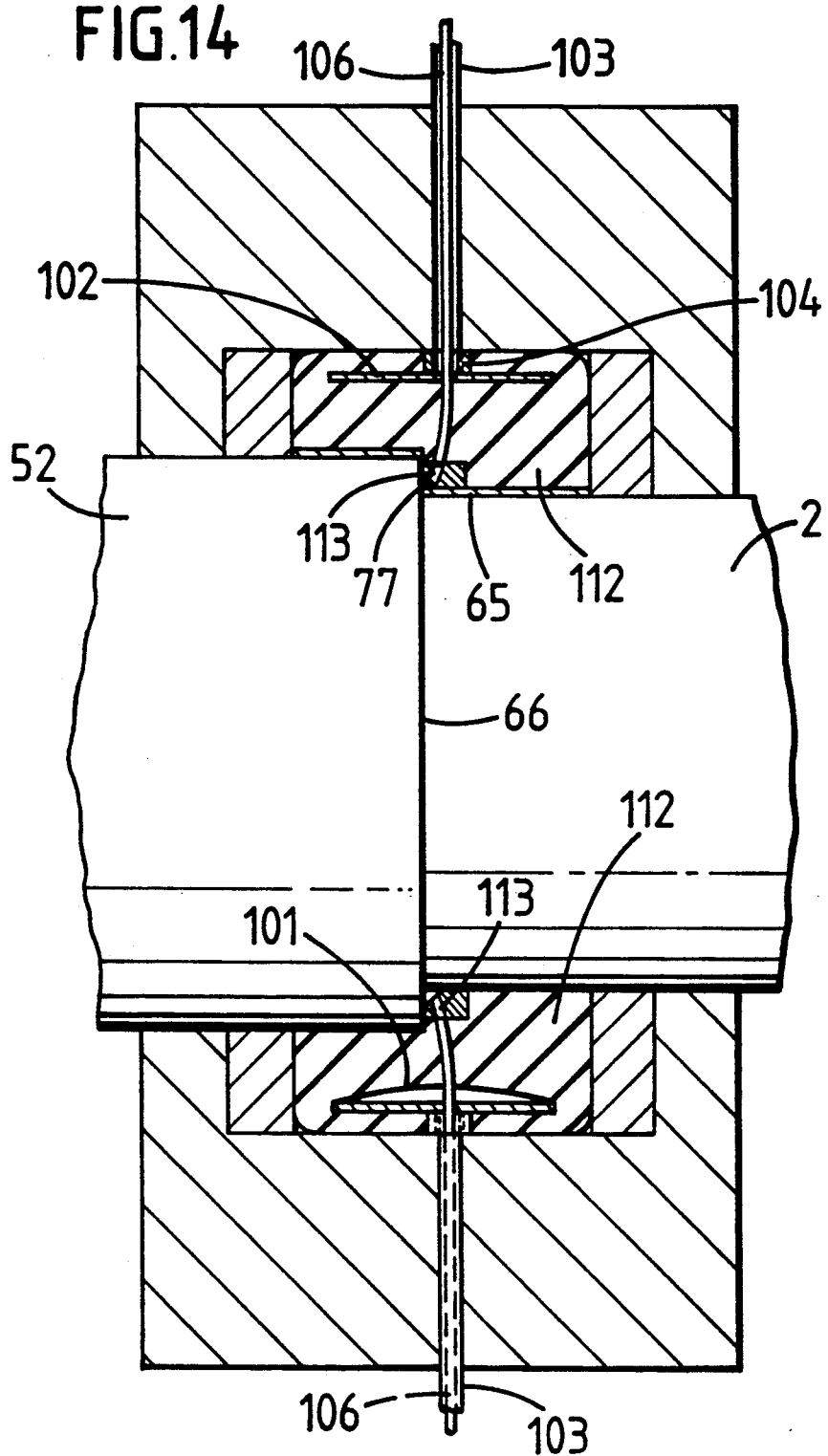
Figure 15:
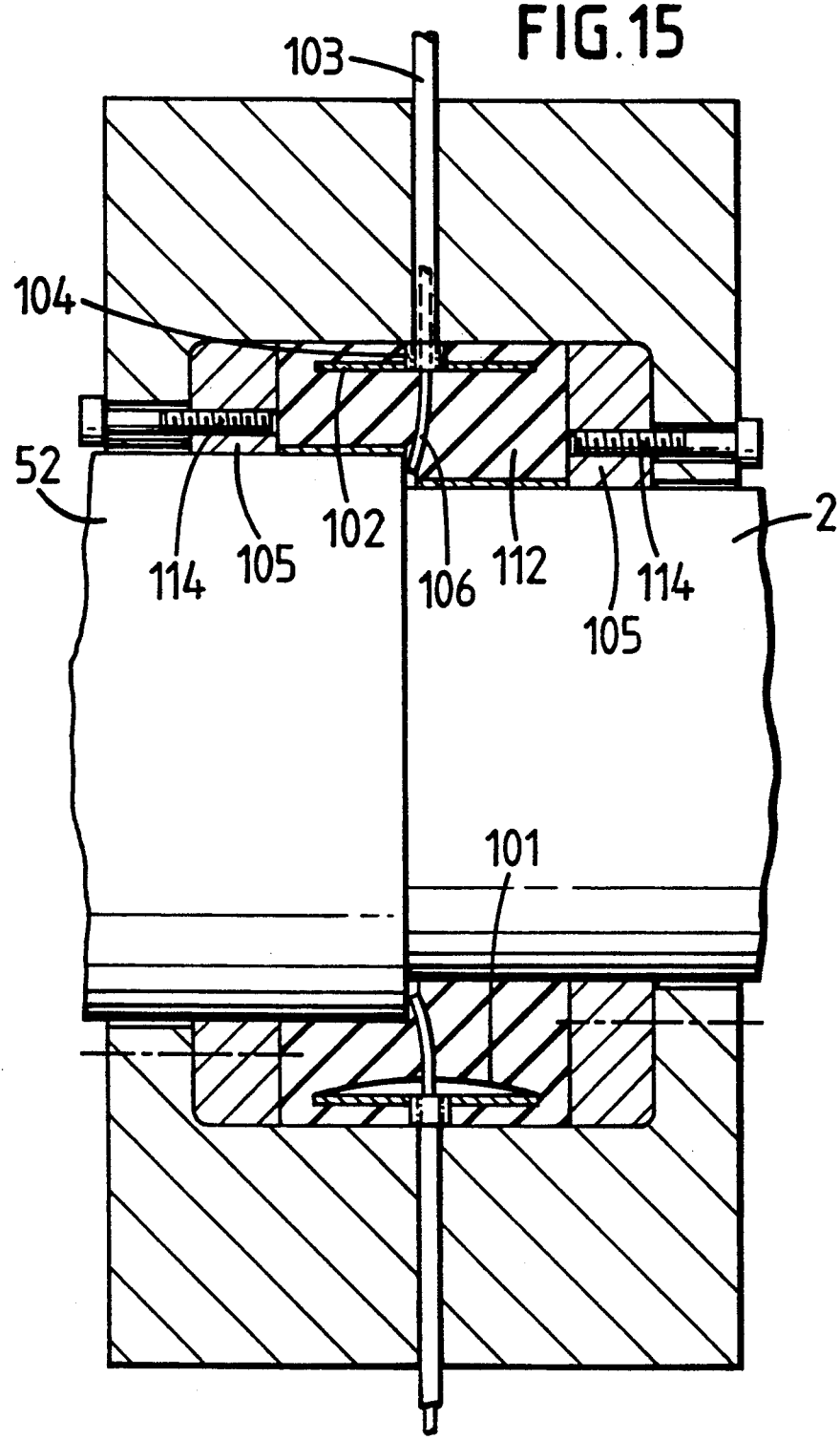
Figure 16:
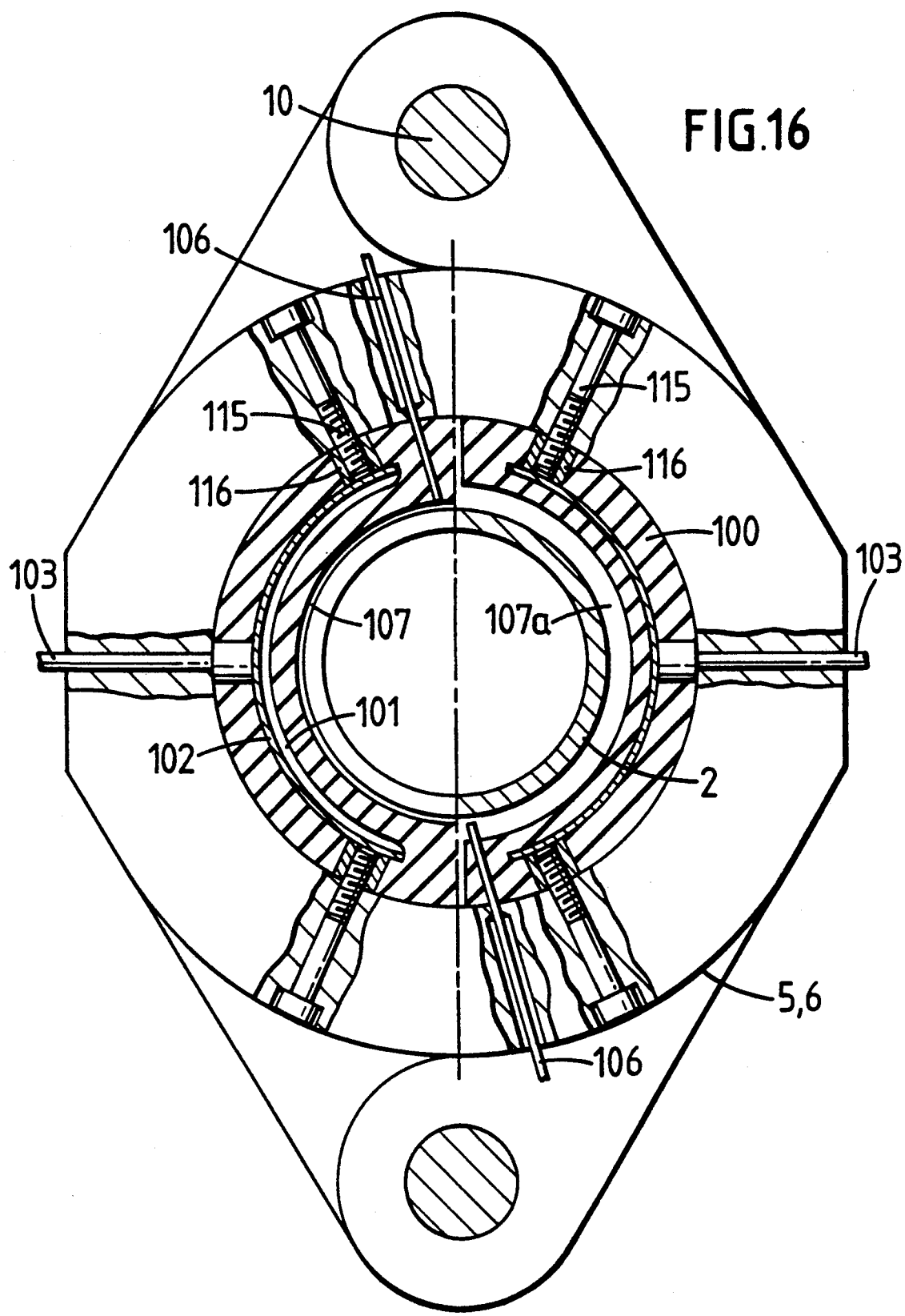

FIG. 7 is a cross-section to an enlarged scale through the apparatus in the zone of a separating line of a pipe/socket connection, FIG. 7a shows a testing chamber formed by a chamfering of one edge of the test ring, FIG. 7b shows a testing chamber of rectangular cross-section provided with a notch, FIG. 8 shows the arrangement of a pressure cylinder operating in the longitudinal direction of the test piece to load the sealing members, FIG. 9 shows another arrangement of pressure cylinders operating in the longitudinal direction, FIG. 10 is a cross-section through an apparatus in the zone of the separating line with a sealing ring, which can be pressurized by a liquid pressure medium, in the inoperative condition, FIG. 11 shows the construction illustrated in FIG. 1 with its pressure ring placed under pressure, FIG. 12 shows an apparatus with a sealing ring for use in testing a separating line between two hollow members of different diameters, FIG. 13 is a cross-section through an apparatus with a sealing ring which has a test ring for framing the separating line, the test gas supply line being disposed concentrically in the pressure medium supply line, FIG. 14 shows a construction similar to the construction shown in FIG. 13, but with a reinforcement of the annular gap in the sealing member, FIG. 15 shows the arrangement of safety screws to prevent the displacement and dropping-out of lateral supporting plates for the sealing ring, and FIG. 16 shows the arrangement of retaining screws to prevent any displacement of the sealing ring inside the casing.

Pipes 2 and 3, screwed to one another and belonging to an overall pipe string to be let down into a borehole are checked for gas tightness in a drilling tower 1. The testing place is the separating line of the pipe connection (not shown in detail). An apparatus consisting of casings 5 and 6 is resiliently suspended from suspension wires 4 by means of springs 8 and 9. Each casing consists of two parts which engage like clamps around the separating line to be tested and are rotatably interconnected. Hinge pins have the reference 10. On the side opposite the hinge pin, closure pins 11 are inserted through members 12 and 13 inter-engaging after the fashion of hinges. Test gas can be forced to the testing places via ducts 14.

Gas emerging through leakages into the interior of the pipes 2; 3 is intercepted by a breathing chamber 15 and displayed by a display apparatus 16 and recorded by a leakage-recording computer 17.

A winch 18 for the breathing device, a pump 19 for the test gas and a control stand 20 are combined into a unit.

A test ring 25 of U-shaped cross-section, whose U-shaped arms are pressed against the peripheral surfaces of pipe portions 23 and 24 on both sides of the separating line 21 is used to check a separating line 21 at the end of a screwed connection 22 between the two pipe portions 23 and 24, which are of identical diameter. As a result, a testing chamber 25A is formed to which test gas is supplied via a connecting duct 14. A tensioning piston 27 is acted upon by pressurized water or an equivalent hydraulic fluid. The tensioning piston transmits the pressure to a sealing member 26 of elastomeric material. Under high pressure this material behaves similarly to a liquid and is therefore able to hermetically seal all gaps and separating lines. The pressurized water can be supplied to cylindrical pressure chamber 30 via ducts 29 in cylinder closure screw 28. The tensioning piston 27 is pressed against the sealing member 26 by a corresponding force.

Alternatively, the tensioning pistons 27 can also be disposed to act in the longitudinal direction of the pipe (axially), to act upon the associated sealing members.

FIG. 4 shows the cylindrical space above the tensioning piston 27 closed by a cylinder flange 40 attached by means of screws 41.

To test separating lines 26 at the ends of a pipe socket 52 (FIGS. 5 and 6), as shown in FIGS. 1, 5 and 6 two casings 5 and 6 interconnected via tie rods 60 are used simultaneously. The tie rods fix the top casing 5 by means of nuts 61 and 62, while the bottom casing 6 can be displaced on the tie rods 60 and is kept at a distance by helical springs disposed on the tie rods. Set screws 34 acting as stops and connected to the tie rods 60 secure the bottom casing in its bottom end position. Quick-acting clamping devices 72 are provided for the closure of the casing halves, to produce precentering and then enable the closure pins 11 to be inserted.

In this case also the test rings 65 are enclosed by sealing members 67 of elastomeric material. To compensate for the different external diameters of pipe socket 52 and the pipes 2; 3 interconnected thereby and also of the different sealing members, adaptor rings 68 are provided which can be secured in the casing by means of screws 69. Handles 70 are provided for guiding the casings during alignment prior to use.

Testing chambers 75 and 76 (FIGS. 7a and 7b) at separating lines 66 of pipe/socket connections can be formed either by a simple chamfering 77 or a simple corner groove 78 in conjunction with the tube and socket surfaces against which the test ring 65 bears.

The test chambers created thereby are so small that they can be safely and quickly filled with a testing gas and supplied with the sometimes necessary very high pressure of well above 1000 bar.

When a pressure cylinder 80 acting in the longitudinal direction of the test piece is provided, a pressure medium is introduced into the cylinder interior 81. A pressure piston 82 to which a plunger 83 is attached is as a result pressed against the sealing member 67. The sealing member opposite the sealing member 67 is also acted upon by a plunger 84 attached to the end 85 of the pressure cylinder 80. Since the material of the sealing members behaves similarly to a liquid, the pressure is propagated uniformly to all sides, so that the test rings 65 are adequately sealed even with a horizontal arrangement of the kind illustrated.

Separate sealing members are not used in the construction illustrated in FIG. 9. In this embodiment the test rings 90 are themselves made from an elastomeric material and act as sealing rings ensuring an adequate seal against the surrounding air when acted upon by pressure forces. To this end they are engaged around by steel pressure rings 91 acted upon by the force of a piston 93 disposed in a pressure cylinder 92. A number of such units can be provided uniformly distributed over the periphery of the overall apparatus. However, the piston 93 can also be constructed circular at the end, to load the pressure rings 91 uniformly over their periphery. Working medium is supplied to the pressure cylinder 92 via bores 94. The direct force of the piston is transmitted to the abutting steel pressure ring 91. The reaction force of the piston-and-cylinder unit is absorbed by a stop ring 95 which is mounted displaceably on the pipe 3 and transmits the force via a tie rod 96 to a second stop ring 97 displaceably mounted on the second pipe 2 to be interconnected. The second stop ring 97 then transmits the force to the abutting steel pressure ring 91 and therefore in the longitudinal direction to the second test ring 90 of elastomeric material. In this case also, after being released the compression springs 63 ensure that the elements are expanded apart. The steel rings 91 transmitting the pressure are formed with recesses 91a, to enable the test gas to be introduced via the supply pipes 14.

In the construction illustrated in FIG. 10 disposed inside a casing 5; 6 is a sealing ring 100 which cannot be acted upon by pressure via tensioning pistons, but which has an inner annular gap 101 which at least partially engages around the separating line to be tested and which can be acted upon by a liquid pressure medium. The liquid pressure medium passes into the annular gap via at least one pressure line 103 extending radially through the casing 5; 6. The gap can be reinforced by a dish-shaped supporting plate 102 on the radial outer wall of the annular gap. As a result, the material situated between the supporting plate 102 and the casing 5; 6 cannot be subjected to any great shaping.

The line 103 for the pressure medium, for example, pressurized water, engages by its inner end in a threaded sleeve 104 rigidly connected, for example, by welding, to the supporting plate 102.

The sealing ring 100 is framed by supporting rings 105 at both ends. A testing medium pipe 106, for example helium, extends, offset in the peripheral direction in relation to the pressurized water line 103, through the casing 5; 6 and the sealing ring 100 as far as test chamber 107, which in the present example is formed by the contact surfaces between the sealing ring 100 and the surfaces of the testpieces, the two pipe ends 23 and 24 and the lateral supporting rings 105.

A guide sleeve 108 for the testing medium pipe 106 is vulcanized into the sealing ring 100. The test gas pipe 106 is inserted through a bore 109 in the guide sleeve 108 into the pressure chamber 107. There is a close loose clearance between the bore 109 and the test gas pipe 106, so that when the pressure ring 100 is pressurized, elastomeric material is prevented from penetrating into bore 110 of casing 5; 6.

FIG. 11 shows how the sealing ring 100 seals the separating line 21 and reduces the test chamber 107 to a small annular cavity. For this purpose a pressurized fluid 111 was introduced into the annular gap 101 and acted upon by a very high pressure. Under the high pressure, which can reach a value of 1000 bar and more, the annular gap 101 is widened thereby uniformly deforming the sealing ring over a large proportion of a periphery to seal the separating line. Test gas can then be fed via the supply line 106 to the remaining small test chamber 107 and acted upon by the required testing pressure without risk.

The embodiment illustrated in FIG. 12 differs from that shown in FIGS. 10 and 11 by a sealing ring for a separating line between hollow members of different diameter. The sealing ring 112 shows at separating line 61 a test chamber produced by the chamfering of the sealing ring edge lying at the separating line. At both ends the sealing ring is framed by supporting rings, one of which takes the form of an interchangeable adaptor ring 68 for hollow bodies of different diameters. In the embodiment illustrated in FIG. 12 the annular gap 101 is acted upon by pressurized water 111, so that the separating line 61 is sealed, while maintaining a test chamber 118 on the generated surfaces of the hollow members 2 and 52 screwed together.

In the apparatus shown in FIG. 13 the sealing ring 112 has an annular gap 101 which is not reinforced at its radially outward surfaces. In this case the annular gap is situated close to casing wall 5, so that when pressure is applied there is only a negligible deformation of the elastomeric material between the annular gap and the casing wall. The effect of the annular gap on the sealing surface of the ring is not adversely affected thereby.

In the embodiment illustrated a test ring 65 is let into the sealing member; via a chamfering 77 corresponding to the embodiment illustrated in FIG. 7a the test ring encloses the separating line and cooperates therewith to form a test chamber.

The testing gas pipe 106 extends concentrically through a pressurized water pipe 103. The liquid pressure medium passes through the annular gap between the testing gas pipe 106 and the pressurized water pipe 103 into the annular gap 101. The action of the pressure is shown in the lower half of FIG. 13 by a widening of the annular gap.

FIG. 14 shows a very similar construction to FIG. 13, but in combination with a supporting plate 102 for the annular gap 101. The pressurized water pipe is screwed into a threaded sleeve 104 and contains the testing gas pipe 106 concentrically. The pipe 106 is continued radially inwards through sealing ring 112 as far as the metal test ring 65, where it is continued in a bore 113.

FIG. 15 shows a construction similar to FIG. 14; however, it has not test ring, but additional safety screws 114 which prevent the supporting rings 105 and the sealing ring 112 from being displaced in the peripheral direction. To this end, the safety screws 114 engage through the supporting rings 105 and exert a clamping action on the sealing ring 112.

An alternative method of securing the sealing rings against displacement in the peripheral direction is illustrated in FIG. 16, which shows safety screws 115 extending radially through the casing and engaging in threaded sleeves 116 which are vulcanized into the sealing ring.

The left-hand half of FIG. 16 shows the apparatus under test pressure, with a widened annular gap 101 and a test chamber 107 of very small volume, while the right-hand half shows the expanded state of the apparatus, wherein the test chamber 107 is widened to an appreciably larger intermediate space 107a between the generated surface of the hollow member 2 and the internal periphery of the sealing ring 100; 112.

As a result of the fact that guide sleeves 116 for the safety screws bear via their radially outer ends against the casing wall, at the same time the supporting plates 102 are prevented from being opened up—i.e., undesirably deformed—at their outer ends.

The annular gap 101 produces a pressure chamber of large area by which the elastomeric material can be pressed more uniformly and also with greater force against the testpieces; for example, for a high enough contact pressure, a lower hydraulic pressure is sufficient than with the use of individual pressure plungers, which transmit the pressure forces in point form to the sealing ring. The contact pressure merely needs to be maintained slightly above the test pressure of the test gas, to prevent the test gas from migrating through to the sides.

What is claimed is:

1. An apparatus for testing the gas-tightness of a joint between hollow members, which apparatus comprises:
   a) test gas applying means for applying a test gas to the outside of said joint; and
   b) means for detecting test gas in said hollow members;
   wherein said test gas applying means comprises:
   c) a gas testing chamber;
   d) a sealing ring of elastomeric material for hermetically sealing said gas testing chamber;
   e) a casing enclosing said sealing ring;
   f) pressure applying means for applying pressure to said sealing ring;
   g) means to supply a test gas to said gas testing chamber; and h) said gas testing chamber partially bounded by a test ring which is embedded in said sealing ring and which, in use, spans the joint to be tested and bears against the surfaces of the hollow members to either side of the joint.

2. An apparatus according to claim 1 wherein said test ring is of generally U-shape cross-section so that, in use, the free ends of the "U" bear on the surfaces of the hollow members to either side of the joint and cooperate therewith to define said gas testing chamber.

3. An apparatus according to claim 1 wherein said test ring is of generally rectangular cross-section with a chamber at one corner which, in use, spans across a joint and cooperates therewith to define said gas testing chamber.

4. An apparatus according to claim 1 wherein said test ring is of generally rectangular cross-section with a notch at one corner which, in use, spans across a joint and cooperates therewith to define said gas testing chamber.

5. An apparatus as claimed in claim 1 wherein said test ring is made from elastomeric material.

6. An apparatus for testing the gas-tightness of a joint between hollow members, which apparatus comprises:
   a) test gas applying means for applying a test gas to the outside of said joint; and
   b) means for detecting test gas in said hollow members;
   wherein said test gas applying means comprises:
   c) a gas testing chamber;
   d) a sealing ring of elastomeric material for hermetically sealing said gas testing chamber;
   e) a casing enclosing said sealing ring;
   f) pressure applying means for applying pressure to said sealing ring;
   g) means to supply a test gas to said gas testing chamber, and
   h) said sealing ring bounded by support rings, one support ring having an internal diameter which differs from the internal diameter of the other support ring to facilitate mounting said apparatus on a joint between hollow members of different diameters.

7. An apparatus for testing the gas-tightness of a joint between hollow members, which apparatus comprises:
   a) test gas applying means for applying a test gas to the outside of said joint; and
   b) means for detecting test gas in said hollow members;
   wherein said test gas applying means comprises;
   c) a gas testing chamber;
   d) a sealing ring of elastomeric material for hermetically sealing said gas testing chamber;
   e) a casing enclosing said sealing ring;
   f) pressure applying means for applying pressure to said sealing ring, said pressure applying means including a piston slidably mounted in said casing and actuable for applying pressure to said sealing ring, and
   g) means to supply a test gas to said gas testing chamber.

8. An apparatus as claimed in claim 7, including a source of hydraulic fluid connected to said casing and actuable to urge said piston against said sealing ring.

9. An apparatus as claimed in claim 7, including four pistons slidably mounted in said casing and disposable around said joint at 90° intervals.

10. An apparatus as claimed in claim 7, wherein said piston is disposed to slide substantially parallel to the axis of said hollow members.

11. An apparatus for testing the gas-tightness of a joint between hollow members, which apparatus comprises:
   a) test gas applying means for applying a test gas to the outside of said joint; and
   b) means for detecting test gas in said hollow members:
   wherein said test gas applying means comprises:
   c) a gas testing chamber;
   d) a sealing ring of elastomeric material for hermetically sealing said gas testing chamber;
   e) a casing enclosing said sealing ring;
   f) pressure applying means for applying pressure to said sealing ring, said pressure applying means comprising an annular ga in said sealing ring;
   g) a support plate disposed so that said annular gap lies between said support plate and said hollow members; and
   h) means to supply a test gas to said gas testing chamber.

12. An apparatus according to claim 11, wherein said support plate is rigidly connected to a wall of said gap and is connected to a sleeve for connection to a source of fluid under pressure.

13. An apparatus according to claim 12, including a pipe supplying test gas to said gas testing chamber extending through said sleeve.

14. An apparatus for testing the gas-tightness of a joint between hollow members, which apparatus comprises:
   a) test gas applying means for applying a test gas to the outside of said joint; and
   b) means for detecting test gas in said hollow members;
   wherein said test gas applying means comprises:
   c) a gas testing chamber;
   d) a sealing ring of elastomeric material for hermetically sealing said gas testing chamber;
   e) a casing enclosing said sealing ring, said casing comprising two parts which are hinged together, and including a quick-action tensioning device connected between said parts of said casing to facilitate precentering of said casing on said hollow members;
   f) pressure applying means for applying pressure to said sealing ring; and
   g) means to supply a test gas to said gas testing chamber.

15. An apparatus for testing the gas-tightness of a joint between hollow members, which apparatus comprises:
   a) test gas applying means for applying a test gas to the outside of said joint; and
   b) means for detecting test gas in said hollow members;
   wherein said test gas applying means comprises:
   c) a gas testing chamber;
   d) a sealing ring of elastomeric material for hermetically sealing said gas testing chamber, said sealing ring secured to said casing by screws extending generally parallel to said hollow members;
   e) a casing enclosing said sealing ring;
   f) pressure applying means for applying pressure to said sealing ring; and g) means to supply a test gas to said gas testing chamber.

16. An apparatus for testing the gas-tightness of a joint between hollow members, which apparatus comprises:
   a) test gas applying means for applying a test gas to the outside of said joint; and
   b) means for detecting test gas in said hollow members;
wherein said test gas applying means comprises:
   c) a gas testing chamber;
   d) a sealing ring of elastomeric material for hermetically sealing said gas testing chamber;
   e) a casing enclosing said sealing ring;
   f) at least one threaded sleeve embedded in said sealing ring and said sealing ring attached to said casing by a screw which passes through said casing and threadedly engages said threaded sleeve;
   g) pressure applying means for applying pressure to said sealing ring; and
   h) means to supply a test gas to said gas testing chamber.

17. An apparatus for testing the gas-tightness of a joint between hollow members, which apparatus comprises:
   a) test gas applying means for applying a test gas to the outside of said joint; and
   b) means for detecting test gas in said hollow members;
wherein said test gas applying means comprises:
   c) a gas testing chamber;
   d) a sealing ring of elastomeric material for hermetically sealing said gas testing chamber;
   e) a guide sleeve in said sealing ring and a gas supply pipe extending through said guide sleeve to said gas testing chamber, wherein a clearance space is provided between said sealing ring and said gas supply pipe;
   f) a casing enclosing said sealing ring;
   g) pressure applying means for applying pressure to said sealing ring; and
   h) means to supply a test gas to said gas testing chamber.

18. An assembly comprising two apparatuses arranged side by side and connected by tie rods, each apparatus comprising:
   a) a test gas applying means for applying a test gas to the outside of said joint; and
   b) means for detecting test gas in said hollow members;
wherein said test gas applying means comprises:
   c) a gas testing chamber;
   d) a sealing ring of elastomeric material for hermetically sealing said gas testing chamber;
   e) a casing enclosing said sealing ring;
   f) pressure applying means for applying pressure to said sealing ring; and
   g) means to supply a test gas to said gas testing chamber.

19. An assembly as claimed in claim 18, wherein said pressure applying means comprises a common piston and cylinder assembly arranged to act substantially parallel to the axis of said hollow members.

* * * * *